United States Patent
Hershey et al.

(10) Patent No.: US 9,685,155 B2
(45) Date of Patent: *Jun. 20, 2017

(54) METHOD FOR DISTINGUISHING COMPONENTS OF SIGNAL OF ENVIRONMENT

(71) Applicant: Mitsubishi Electric Research Laboratories, Inc., Cambridge, MA (US)

(72) Inventors: John Hershey, Winchester, MA (US); Jonathan Le Roux, Arlington, MA (US); Shinji Watanabe, Arlington, MA (US); Zhuo Chen, New York, NY (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/147,382

(22) Filed: May 5, 2016

(65) Prior Publication Data

US 2017/0011741 A1    Jan. 12, 2017

Related U.S. Application Data

(63) Continuation of application No. 14/792,960, filed on Jul. 7, 2015, now Pat. No. 9,368,110.

(51) Int. Cl.
*G10L 15/00* (2013.01)
*G10L 15/16* (2006.01)
(Continued)

(52) U.S. Cl.
CPC ............ *G10L 15/16* (2013.01); *G06N 3/0445* (2013.01); *G06N 3/0454* (2013.01);
(Continued)

(58) Field of Classification Search
CPC ........ G10L 15/02; G10L 15/16; G06K 9/6218; G06N 3/02; G06N 3/0445
(Continued)

(56) References Cited

FOREIGN PATENT DOCUMENTS

| JP | 2014219557 | 11/2014 |
|---|---|---|
| JP | 2015057630 | 3/2015 |

OTHER PUBLICATIONS

F. R. Bach and M. I. Jordan, "Learning spectral clustering, with application to speech separation," JMLR, vol. 7, pp. 1963-2001, 2006.

(Continued)

*Primary Examiner* — Charlotte M Baker
(74) *Attorney, Agent, or Firm* — Gene Vinokur; James McAleenan; Hironori Tsukamoto

(57) ABSTRACT

A method distinguishes components of a signal by processing the signal to estimate a set of analysis features, wherein each analysis feature defines an element of the signal and has feature values that represent parts of the signal, processing the signal to estimate input features of the signal, and processing the input features using a deep neural network to assign an associative descriptor to each element of the signal, wherein a degree of similarity between the associative descriptors of different elements is related to a degree to which the parts of the signal represented by the elements belong to a single component of the signal. The similarities between associative descriptors are processed to estimate correspondences between the elements of the signal and the components in the signal. Then, the signal is processed using the correspondences to distinguish component parts of the signal.

19 Claims, 1 Drawing Sheet

(51) Int. Cl.

| | |
|---|---|
| *G10L 25/51* | (2013.01) |
| *G10L 25/30* | (2013.01) |
| *G10H 1/00* | (2006.01) |
| *G10L 21/0272* | (2013.01) |
| *G06N 3/04* | (2006.01) |
| *G10L 15/02* | (2006.01) |
| *G10L 15/06* | (2013.01) |
| *G06K 9/62* | (2006.01) |

(52) U.S. Cl.
CPC ............. *G06N 3/0472* (2013.01); *G10H 1/00* (2013.01); *G10L 15/02* (2013.01); *G10L 15/063* (2013.01); *G10L 21/0272* (2013.01); *G10L 25/30* (2013.01); *G10L 25/51* (2013.01); *G06K 9/6218* (2013.01); *G10H 2210/056* (2013.01); *G10H 2240/075* (2013.01); *G10H 2250/311* (2013.01)

(58) Field of Classification Search
USPC ......................................................... 704/232
See application file for complete search history.

(56) References Cited

OTHER PUBLICATIONS

C. Fowlkes, D. Martin, and J. Malik, "Learning affinity functions for image segmentation: Combining patch-based and gradient-based approaches," in Proc. CVPR, 2003, vol. 2, pp. 54-61.

F. Tian, B. Gao, Q. Cui, E. Chen, and T.-Y. Liu, "Learning deep representations for graph clustering," in Proc. AAAI, 2014.

P. Huang, Y. Huang, W. Wang, and L. Wang, "Deep embedding network for clustering," in Proc. ICPR, 2014, pp. 1532-1537.

T. Mikolov, I. Sutskever, K. Chen, G. S. Corrado, and J. Dean, "Distributed representations of words and phrases and their compositionality," in Proc. NIPS, 2013, pp. 3111-3119.

J. R. Hershey, J. Le Roux, and F. Weninger, "Deep unfolding: Model-based inspiration of novel deep architectures," Sep. 2014, arXiv:1409.2574.

Liutkus et all, "Kernel Spectrogram models for source separation," Hands-free Speech Communication and Microphone Arrays (HSCMA), , 2014.

Liutkus et al., "Kernel additive models for source separation," Signal Processing, IEEE Transactions, vol. 62.16, pp. 4298-4310, 2014.

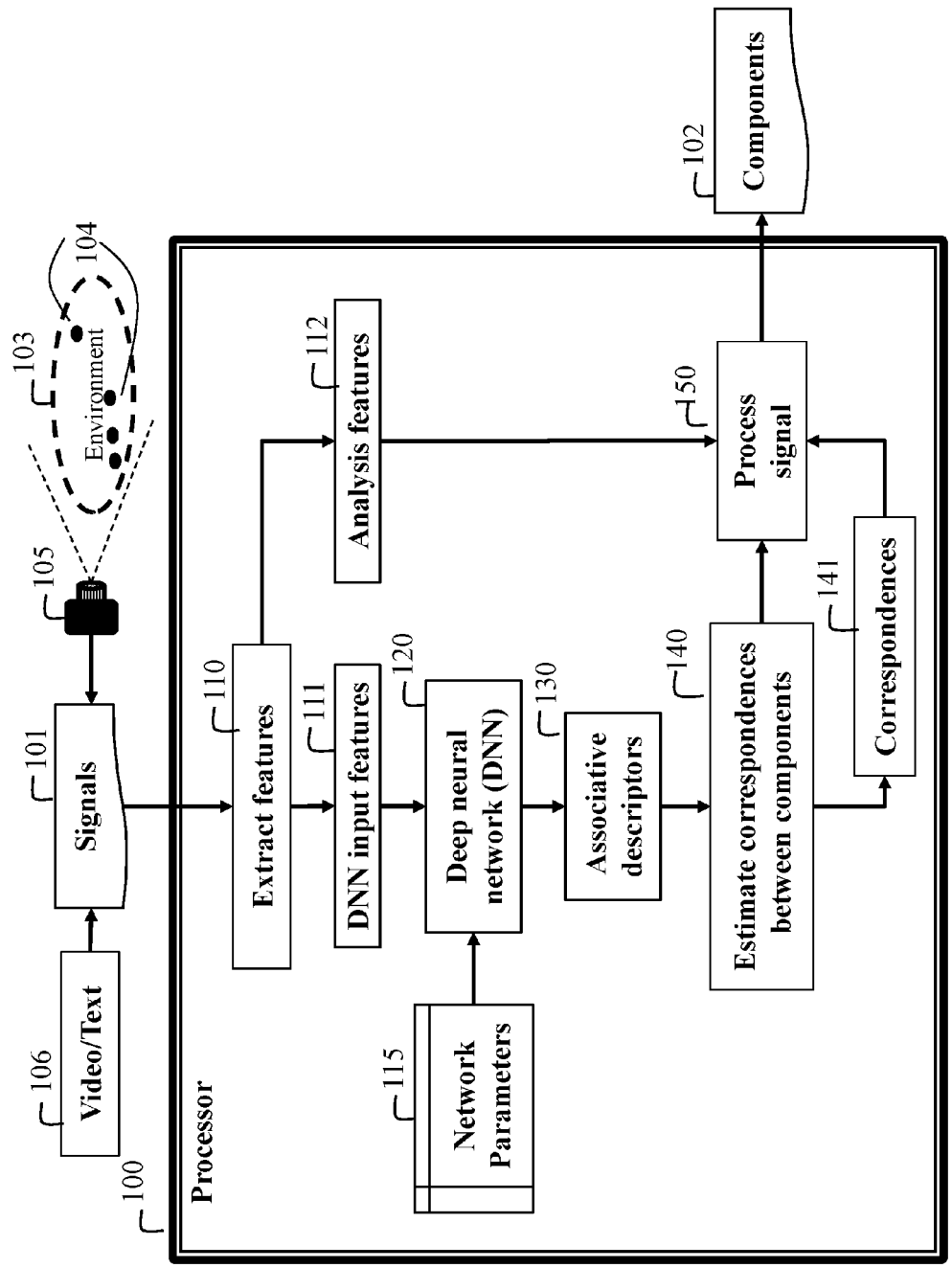

METHOD FOR DISTINGUISHING COMPONENTS OF SIGNAL OF ENVIRONMENT

RELATED APPLICATION

This application is a continuation of co-pending U.S. patent application Ser. No. 14/792,960 entitled "Method for Distinguishing Components of an Acoustic Signal," filed by Hershey et al. on Jul. 7, 2015 and incorporated herein by reference.

FIELD OF THE INVENTION

This invention relates generally to signal processing, and more particularly to distinguishing components of an acoustic signal.

BACKGROUND OF THE INVENTION

In real world perception, one is often confronted with the problem of selectively attending to objects or sources that emit signals. Unfortunately, there are an incredible variety of acoustic signals. For example, the human voice can be used for speech and singing, musical instruments, such as strings, woodwinds, and percussion are another class of acoustic signals. Acoustic signals can come from natural sound, such as animals, and the environment as well as from man-made sound sources.

Humans typically have no difficulty in separating both well known sounds as well as novel sounds. However, for generative models, the great variety of possible sounds presents a modeling problem. It is difficult to construct a large model that can be applied to any type of sound. In addition, sounds can obscure each other in a state-dependent way. Typically, the states of all sounds determine which sound dominates a particular part of the acoustic spectrum.

For example, the speech from different people are intermingled in a single mixture of signal in what is known as the cocktail party effect. Humans are capable of focusing auditory attention on a particular stimulus while filtering out a range of other stimuli. This is exemplified by the way that a partygoer can focus on a single conversation in a noisy room. In acoustic signal processing, this is known as auditory scene analysis, which seeks to identify the components of acoustic signals corresponding to individual sound sources (such as people's voices) in the mixture signal.

Even though the components of the sound correspond to objective entities or events in the world, how one can precisely define an analysis of the signal into components can differ depending on the purpose of the analysis. There may be different criteria for analysis and different levels of categorization that are considered when defining the component structure to be analyzed.

For example, many types of sound naturally admit a hierarchical decomposition of components and their sub-component parts. In speech, one person's voice could be considered a component at one level of analysis, whereas each word in the person's speech could be considered a component at a more detailed level of analysis. Moreover the sound from a group of speakers could be considered a component if the task is to separate all speech from non-speech. Alternately the division of speech into components could consider male speech and female speech as two different components.

Similarly, in music there are natural hierarchies of components and sub-components. At the highest level of analysis is the whole ensemble of sound, followed by different groups of instruments, at a lower level of analysis, different individual instruments, and finally individual note events. The components representing groups of instruments could be defined by different criteria, such as the category of instrument (e.g., flutes versus clarinets), or by the melodic or rhythmic part (e.g., themes versus accompaniment) that the instruments play.

Despite the fact that there may be different and even conflicting definitions of the components of a signal, one can define a particular component structure for a given task. For example, separating speech from non-stationary noise is a clearly defined task. The definition of the component structure can be made concrete by the use of databases of examples of acoustic data containing a mixture of speech and non-stationary noise, and the example components speech and non-stationary noise. By arbitrarily mixing together speech and non-stationary noise signal components, one can define a large problem space spanned by an arbitrarily large set of examples, that well represents the target application.

In general, however, separating speech from non-stationary noise is considered to be a difficult problem. Separating speech from other speech signals is particularly challenging because all sources belong to the same class, and share similar characteristics. Separating speech from same gender speakers is one of the most difficult cases because the pitch of the voice is in the same range.

When the goal is to analyze a complex acoustic scene into its components, different sounds may be overlapping and partially obscure each other in an analysis feature space, the number of sound and sound types may be unknown, multiple instances of a particular type may be present.

These problems can addressed by treating the analysis as a segmentation problem, where a set of analysis feature elements in a signal is formulated via an indexed set of analysis features derived from the signal. Each element includes the analysis feature values which are typically multi-dimensional representations of a tiny part of the signal.

In order to use the elements to distinguish components, the elements have to be designed such that in general each element mainly represents a part of only one of the components. This is approximately true in some cases. For example, in a mixture of speakers analyzed by a short-time fourier transform, a large percentage of the time-frequency bins are dominated by one speaker or another. In this sense, the elements dominated by a single component correspond to that component, and if they can be identified, they can be used to reconstruct an approximation to that component. Partitioning the signal elements into groups thus can provide a means of segmenting the signal into components.

Although clustering methods could be used for segmentation, segmentation is fundamentally different. Clustering is typically formulated as a domain-independent problem based on simple objective functions defined on pairwise point relations. In contrast, segmentation usually depends on complex processing of the entire input, and the task objective can be arbitrarily defined using training examples with segment labels.

Segmentation can be broadly categorized as: class-based segmentation where the goal is to label known object classes based on learned object class labels; and partition-based segmentation where the task is to segment the input based on learned partition labels without requiring object class labels. Solving a partition-based segmentation problem has the advantage that unknown objects can be partitioned.

In single-channel speech separation, the time-frequency elements of the spectrogram are partitioned into regions dominated by a target speaker, either based on classifiers or generative models. Deep neural networks can also be applied to class-based segmentation problems.

However class-based approaches have limitations. The task of labeling known classes does not address the general problem in real world signals where there can be a large number of possible classes, and many objects may not have a well-defined class. Also, it is not clear how to directly apply conventional class-based approaches to more general problem. Class-based deep network models for separating sources require explicitly representation of output classes and object instances in the output nodes, which leads to difficulties in the general case.

Although generative model-based methods can in theory be flexible with respect to the number of model types and instances at test time, there remain great difficulties in scaling inference computationally to the potentially much larger problems posed by more general segmentation tasks.

In contrast, humans seem to solve the partition-based problem, because they can easily segment novel objects and sounds. This observation is the basis of Gestalt theories of perception, which attempt to explain perceptual grouping in terms of features such as proximity and similarity. The partition-based segmentation task is closely related, and follows from a tradition of work in image segmentation and acoustic separation. Application of the perceptual grouping theory to acoustic segmentation is generally known as computational auditory scene analysis (CASA).

Spectral Clustering

In machine learning, spectral clustering has been used for image and acoustic segmentation. Spectral clustering uses local affinity measures between features of elements of the signal, and optimizes various objective functions using spectral decomposition of a normalized affinity matrix. In contrast to conventional central clustering, such as k-means, spectral clustering has the advantage that it does not require points to be tightly clustered around a central prototype, and can determine clusters of arbitrary topology, provided that the clusters form a connected sub-graph. Because of the local form of the pairwise kernel functions used, in difficult spectral clustering problems, the affinity matrix has a sparse block-diagonal structure that is not directly amenable to central clustering, which works well when the block diagonal affinity structure is dense. The powerful but computationally complex eigenspace transformation step of spectral clustering addresses this, in effect, by "fattening" the block structure, so that connected components become dense blocks, before central clustering.

Although affinity-based methods have been used for unsupervised inference methods, multiple-kernel learning methods can be used to train weights for combining separate affinity measures. This enables one to consider using multiple-kernel learning methods for partition-based segmentation tasks in which partition labels are available, but without requiring specific class labels. Those methods have been applied to speech separation including a variety of complex features developed to implement various auditory scene analysis grouping principles, such as similarity of onset, offset, pitch, and spectral envelope, as affinities between time-frequency regions of the spectrogram. The input features can include a dual pitch-tracking model to improve upon the relative simplicity of kernel-based features, at the expense of generality.

Learned feature transformations known as embeddings are used in a number of application. Unsupervised embeddings obtained by auto-associative deep networks, used with relatively simple clustering procedures can outperform spectral clustering methods in some cases. Embeddings trained using pairwise metric learning, using neighborhood-based partition labels, have also been shown to have interesting invariance properties, see Mikolov et al., "Distributed representations of words and phrases and their compositionality," Proc. NIPS, 2013, pp. 3111-3119.

SUMMARY OF THE INVENTION

The embodiments of the invention provide a method for distinguishing components of an acoustic signal using deep neural networks (DNN). The method partitions the signal using deep clustering. Embeddings in the form of associative descriptors, which are discriminative for partition labels given in training data, are determined by deep learning. The method avoids using labels of object classes so that acoustic signals containing novel object classes can be partitioned.

The DNN provides advantages in terms of learning power and speed. However, up to now, it has been unclear how to use DNN in a class-independent way. Despite limitations in terms of learning power and scalability, clustering approaches are flexible with respect to the classes and number of components to be partitioned. To bring these advantages to a DNN, the embodiments use an objective function, which is independent of permutations of label partitions, to train embeddings that approximate an ideal pairwise affinity matrix.

The objective function minimizes distances between embeddings of elements within a partition, while maximizing the distances between embeddings for elements in different partitions. As an advantage, the embeddings allow all partitions and their permutations to be represented implicitly using a fixed-dimensional output of the neural network.

When the DNN is trained on spectrogram features in an acoustic signal including mixtures of two speakers, a prototype embodiment of the method can infer masking functions that improve signal quality by about 6 dB, starting with signals mixed near 0 dB±5 dB. The method can generalize to three-speaker mixtures even if the method is only trained on two-speaker mixtures.

BRIEF DESCRIPTION OF THE DRAWINGS

FIG. 1 is a flow diagram a method for distinguishing one or more components of an acoustic signal according to embodiments of the invention;

DETAILED DESCRIPTION OF THE PREFERRED EMBODIMENTS

The embodiments of our invention provide a method for distinguishing components of a signal using a deep neural network (DNN). The DNN can be a recurrent neural network.

As shown in FIG. 1, signal 101 is acquired of an environment 103. In one embodiment, the environment includes one or more acoustic sources 104 using an acoustic sensor 105, e.g., a microphone. The signal is processed to extract 110 a set of DNN input features 111, and analysis features 112, wherein each analysis feature, in the form of a feature vector that, defines an element of the signal used for segmentation. In another embodiment, a video signal and/or text 106 are associated with the acoustic signal. In addition or alternatively, the signal contains multi-channel acoustic signals.

The analysis features can be in a form of short-time Fourier complex spectral coefficients of the input speech signal determined with a 32 ms window length, 8 ms window shift, and a square root of the Hann window. To ensure the local coherence, the segments of 100 frames are used, roughly the length of one word in speech.

The DNN input features can be any arbitrary feature set. In some embodiments, the DNN input features are the log short-time Fourier magnitudes of the analysis features that define the elements used for segmentation. However in other embodiments the DNN input features can be arbitrary features of the acoustic signal and can differ in number and quality from the analysis features.

The DNN input features are processed using the DNN 120. The DNN is defined by network parameters 115. The DNN assigns an associative descriptor 130 to each element defined by the analysis features. A degree of similarity between the associative descriptors of different elements is related to a degree to which the elements belong to a single component of the signal. In the case of multi-channel acoustic signals, timing relationships between the channels is used to estimate associative descriptors for the elements The similarity relations of the associative descriptors are processed to estimate 140 correspondences 141 between the elements and one or more components. Then, the signal 101 is further processed 150 using the correspondences 151 to distinguish the one or more components 102. The method can be performed in a processor 100 connected to memory and input/output interfaces buses as known in the art.

The method and deep neural network and training are now described in greater detail.

Learning Associative Descriptors for Clustering

The time-domain acoustic signal 101 is x, the analysis features 110 are in the form of a vector $X_i=g_i(x)$, $n \in \{1, \ldots, N\}$ indexed by elements i, where i can be a time-frequency index (t, f), where t indexes frames of the acoustic signal and f represents frequencies. The value of a complex spectrogram at the corresponding time-frequency bin is $X_i=X_{t,f}$.

We assume that there is a reasonable partition of the elements i into regions, which we would like to find, for example, to further process the features $X_i$ separately for each region. In the case of acoustic source separation, for example, these regions can be defined as sets of time-frequency bins in which each source dominates. Estimating the partitions enables us to construct time-frequency masks that can be applied to the elements $X_i$, leading to time-frequency representations that can be inverted in order to separate acoustic sources. Note that the feature transformation $X_i=g_i(x)$ can be optimized to improve the overall segmentation or source separation performance of the system.

To estimate a partition, we determine a K-dimensional embedding in the form of an associative descriptor, $$V=f_\theta(x) \in \mathbb{R}^{N \times K},$$

parameterized by $\theta$, such that performing clustering in the associative descriptors space leads to a partition [1, ..., N] that is similar to a target partition. $V=f_\theta(x)$ is based on the DNN 120, which is a global function of the entire signal x 101. The feature extraction step 110 generates DNN input features 111 for the DNN 120. The DNN input features can be completely different than $X_i$. Thus, our transformation can take into account global properties of the input signal, and the associative descriptors can be considered a permutation, and a cardinality-independent encoding of the estimate of a signal partition based on the elements defined by the analysis features.

Here, we consider a unit-norm associative descriptor, so that $$|v_i|^2=\Sigma_k v_{i,k}^2=1, \forall i,$$

where $v_i=\{v_{i,k}\}$, and $v_{i,k}$ is the value of the k-th dimension of the associative descriptor for element i. We omit the dependency of V on $\theta$ to simplify notations.

The partition-based training requires a reference label indicator $Y=\{y_{i,c}\}$ that maps each element i to each of c arbitrary partition classes, so that $y_{i,c}=1$ when element i is in partition c. For a training objective, we determine associative descriptors that enable accurate clustering according to the partition labels. To do this, we use an expression that is invariant to the number and permutations of the partition labels from one training example to the next, e.g., $$C(\theta)=|VV^T-YY^T|_F^2=\Sigma_{i,j:y_i=y_j}(\langle v_i,v_j \rangle -1)^2+\Sigma_{i,j:y_i \neq y_j}(\langle v_i,v_j \rangle -0)^2, \quad (1)$$

$$=\Sigma_{i,j:y_i=y_j}|v_i-v_j|^2+\Sigma_{i,j}1/4(|v_i-v_j|^2-2)^2, \quad (2)$$

where we used the fact that $|v_i|^2=1$, $\forall i$. In equation (1), the objective is defined in terms of the similarity of the unit vectors $v_i$ and $v_j$, as measured by the inner product $\langle v_i,v_j \rangle =\cos \theta_{i,j}$, where $\theta_{i,j}$ is the angle between $v_i$ and $v_j$. Thus, the objective seeks to increases the similarity to 1 when i and j are in the same partition, and seeks to decrease the similarity to 0 when i and j are in different partitions.

Equivalently, as seen in equation (2), this objective tends to decrease the squared distance $|v_i-v_j|^2$ to 0 for elements within the same partition, while preventing the associative descriptors from trivially collapsing into a single point. The squared distance $|v_i-v_j|^2=2-2\langle v_i,v_j \rangle$ is inversely related to the similarity $\langle v_i,v_j \rangle$.

Note that the first term in equation (2) is equivalent to the objective function that is minimized by the k-means clustering algorithm, as a function of cluster assignments, whereas the second term is a constant with respect to cluster assignments. So, the objective reasonably tries to reduce the k-means assignment error for the reference cluster assignments at training time.

For simplicity, we omit weights here, but an element weight matrix W, which modifies the degree of importance attributed to each element in the objective function, can be included as $C(\theta)=|W(VV^T-YY^T)W^T|_F^2$, in order to place different degrees of importance on linear functions of the elements. For example, a diagonal weight matrix W can be used to give more importance to elements that represent more salient parts of the signal.

We can also optimize the embedding for multiple tasks, by including an associative descriptor weight matrix $A(\phi)$, which modifies the measure of similarity between elements by placing weights on the embedding dimensions of V as a function of a task-related parameter, $\phi$. The objective function in this case becomes $C(\theta)=|VA_\phi(VA_\phi)^T-YY^T|_F^2$. In this way, the associative descriptor can be trained to be useful for multiple different tasks selected by $\phi$, which can be selected at test time. For example, the modified associative descriptor $VA_\phi$ can be used to distinguish different instruments as the components of music for one setting of $\phi$, and to distinguish different individual notes in the same music, for a different setting of $\phi$. In this way a single embedding can be used to provide segmentations at multiple levels of a hierarchy, or for multiple application domains.

To optimize the DNN, we can use gradient-based methods. Fortunately, derivatives of our objective function with respect to the associative descriptors V can be efficiently obtained due to the low-rank structure $$\frac{\partial C}{\partial V^T} = 4V(V^TV) - 4Y(Y^TV), \quad (3)$$

which avoids computing the N×N affinity matrix during training.

This formulation can be related to spectral clustering as follows. We can define an ideal affinity matrix $A^*=YY^T$, that is block diagonal up to permutation and use an inner-product kernel, so that $A=VV^T$ is our affinity matrix, where T is the transpose operator. Our objective becomes $C=|A-A^*|_F^2$, which measures the deviation of the model's affinity matrix from the ideal affinity. Although this function ostensibly sums over all pairs of data points i, j, the low-rank nature of the objective leads to $$C=|VV^T-YY^T|_F^2=|V^TV|_F^2-2|V^TY|_F^2+|Y^TY|_F^2, \quad (4)$$

which avoids explicitly constructing the N×N affinity matrix. In practice, N is orders of magnitude greater than K, leading to a significant speedup. In spectral clustering, a different kernel function would be used that requires computing the N×N affinity matrix. In addition, the kernels used in spectral clustering cause the affinity matrix to have a sparse block-wise structure, which requires eigendecomposition to analyze the components.

For efficiency, spectral clustering therefore typically requires an approximation such as the Nyström low-rank approximation to the affinity matrix, so that the singular value decomposition (SVD) of an N×K matrix can be substituted for the much more complex eigenvalue decomposition of the K×K normalized affinity matrix.

Rather than following spectral clustering in making a low-rank approximation of a full-rank model, our method directly optimizes a low-rank affinity matrix so that the processing is more efficient, and parameters are tuned to the low-rank structure. Due to our low-rank affinity matrix, the block-wise structure of the affinity matrix is dense, and directly amenable to singular value decomposition. Moreover, due to the similarity-based training objective, the simpler clustering methods such as K-means can be used.

During testing, we determine the associative descriptors V on the test signal, and cluster the rows $v_i \in \mathbb{R}^K$, for example, using the k-means clustering procedure. Note that k-means also seeks to minimize $C=|VV^T-YY^T|_F^2$, the same objective used in training, but this time as function of the cluster assignments, Y, holding the network parameters, θ, fixed. Hence, k-means chooses correspondences between elements and components that maximize the similarity $\langle v_i, v_j \rangle$ between associative descriptors, $v_i$ and $v_j$, of elements corresponding to the same component.

We can also alternately perform a spectral-clustering style dimensionality reduction prior to or instead of clustering. We can start with a singular value decomposition (SVD), defined as $\hat{V}=USR^T$ of normalized $\hat{V}=D^{-1/2}V$, where $D=VV^T1_N$, and the singular vectors and singular values are permuted so that $s_{i,i} \geq s_{j,j}$: j>i. We can then cluster the normalized rows of the matrix of m principal left singular vectors, with the i'th row given by $\tilde{u}_{i,r}=u_{i,r}/\sqrt{\Sigma_{r'=1}^m u_{i,r'}}$: r∈[1, m].

Clustering the associative descriptors determines a correspondence between the elements and components of the signal. This can be used to produce a segmentation, wherein each analysis element, indexed by i=(t, f), is assigned to a segment k=c(t, f). This hard clustering can be used to compute a filter $a_{t,f}^k=1$ if k=c(t, f), and $a_{t,f}^k=0$, otherwise. Then the features of the k-th component can be estimated as $\hat{X}_{t,f}^k=a_{t,f}^k X_{t,f}$. We can also obtain a soft clustering, with weights $a_{t,f}^k$, estimated according to a continuous correspondence function according to many existing methods, including determining them based on $\hat{U}$ and using graph-based signal processing methods.

Another extension is to use one or more associative descriptors $z_b$ indexed by class b, which represent an embedding of a class. In this case a classification is performed classifying the element $v_i$ with the class $\hat{b}$ such that $$\hat{b} = \arg\max_b \langle v_i, z_b \rangle,$$

where the function arg max returns a maximum value.

The clustering and estimation steps are an important part of the processing and can be included in the objective functions of the DNN, for example by means of the deep unfolding of the clustering model, see Hershey et al., "Deep unfolding: Model-based inspiration of novel deep architectures," September 2014, arXiv:1409.2574.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for distinguishing one or more components of a signal, comprising steps:
   acquiring the signal from an environment with a sensor;
   processing the signal to estimate a set of analysis features, wherein each analysis feature defines an element of the signal, and has feature values that represent parts of the signal;
   processing the signal to estimate input features of the signal;
   processing the input features using a deep neural network (DNN) to assign an associative descriptor to each element of the signal, wherein a degree of similarity between the associative descriptors of different elements is related to a degree to which the parts of the signal represented by the elements belong to a single component of the signal;
   processing the similarities between associative descriptors to estimate correspondences between the elements of the signal and one or more components in the signal; and
   processing the signal using the correspondences to distinguish the parts of the one or more components of the signal, wherein the steps are performed in a processor.

2. The method of claim 1, wherein the signal is processed to change an intensity of the elements corresponding to the one or more components of the signal.

3. The method of claim 1, wherein the DNN is a recurrent neural network.

4. The method of claim 1, wherein the neural network is a convolutional neural network.

5. The method of claim 1, wherein an association between the associative descriptor and the one or more components is estimated using K-means clustering.

6. The method of claim 1, wherein an association between the associative descriptor and the one or more components is estimated using Gaussian mixture models.

7. The method of claim 1, wherein an association between the associative descriptor and the one or more components is estimated using a singular value decomposition.

8. The method of claim 1, wherein an association between the associative descriptors is processed to form a graph, and graph-based signal processing is performed on the signal.

9. The method of claim 1, wherein an analysis feature transformation that defines the elements is optimized using training data to reduce an error in distinguishing the one or more components of the signal.

10. The method of claim 1, wherein the DNN is optimized using training data to produce the associative descriptors such that the processing of the similarities between associative descriptors to estimate correspondences between the elements of the signal and one or more components in the signal reduces an error in distinguishing the components of the signal.

11. The method of claim 1, wherein one or more of the components of the signal are speech, and the processing of the signal produces a separate signal corresponding to one or more speech signals.

12. The method of claim 1, wherein the one or more components of the signal are used for recognizing objects.

13. The method of claim 12, wherein one or more of the separate signal is processed in a speech recognition system to recognize words spoken by a speaker.

14. The method of claim 1, wherein the one or more components are distinguished using a different measure of similarity to estimate the correspondences.

15. The method of claim 14, wherein the one or more components are organized in a hierarchy and correspondences at one or more levels of the hierarchy are estimated using the different measures of similarity.

16. The method of claim 1, wherein one or more classes are represented using class descriptors, wherein a measure of similarity between an element descriptor and a class descriptor is related to a degree to which the element belongs to the class.

17. The method of claim 1, wherein a video signal that is associated with the signal is processed to assign the associative descriptors to the elements in the video signal, and correspondences between the one or more components and the elements of the signal and the video signal are estimated jointly.

18. The method of claim 1, wherein text that is associated with the signal is processed to assign the associative descriptors to the elements in the text, and correspondences between the one or more components and the elements of the signal and the text are estimated jointly.

19. A non-transitory computer readable memory embodied thereon a program executable by a processor for performing a method for distinguishing one or more components of a signal, the method comprising:

acquiring the signal from an environment using a sensor;

processing the signal to estimate a set of analysis features, wherein each analysis feature defines an element of the signal, and has feature values that represent parts of the signal;

processing the signal to estimate input features of the signal;

processing the input features using a deep neural network (DNN) to assign an associative descriptor to each element of the signal, wherein a degree of similarity between the associative descriptors of different elements is related to a degree to which the parts of the signal represented by the elements belong to a single component of the signal;

processing the similarities between associative descriptors to estimate correspondences between the elements of the signal and one or more components in the signal; and processing the signal using the correspondences to distinguish the parts of the one or more components of the signal.

* * * * *